United States Patent
Lewis et al.

(10) Patent No.: US 11,443,320 B2
(45) Date of Patent: Sep. 13, 2022

(54) INTELLIGENT SYSTEMS FOR IDENTIFYING TRANSACTIONS ASSOCIATED WITH AN INSTITUTION IMPACTED BY AN EVENT USING A DASHBOARD

(71) Applicant: Bank of America Corporation, Charlotte, NC (US)

(72) Inventors: Terry L. Lewis, Denver, NC (US); Swathi Chanda, Cummings, GA (US); Robert W. Johnston, Ramsey, NJ (US); Vanesa Mitrevski, LaGrange, IL (US); Ravi Narasshiman, Matthews, NC (US); Vasan Srini Subramanian, Charlotte, NC (US); Gopalakrishnan Kandasamy, Mooresville, NC (US); Janan Abou-Chakra, Charlotte, NC (US); Amit Pandey, Charlotte, NC (US); Robert Morris Black, Tarpon Springs, FL (US)

(73) Assignee: Bank of America Corporation, Charlotte, NC (US)

( * ) Notice: Subject to any disclaimer, the term of this patent is extended or adjusted under 35 U.S.C. 154(b) by 182 days.

(21) Appl. No.: 16/736,647

(22) Filed: Jan. 7, 2020

(65) Prior Publication Data
US 2021/0209602 A1     Jul. 8, 2021

(51) Int. Cl.
*G06Q 20/40* (2012.01)
*G06Q 30/02* (2012.01)
*G06F 21/55* (2013.01)

(52) U.S. Cl.
CPC ....... *G06Q 20/4016* (2013.01); *G06F 21/554* (2013.01); *G06Q 20/405* (2013.01); *G06Q 20/407* (2013.01); *G06Q 30/0201* (2013.01)

(58) Field of Classification Search
CPC .................................................. G06Q 30/0201
See application file for complete search history.

(56) References Cited

U.S. PATENT DOCUMENTS

| | | |
|---|---|---|
| 5,987,419 A | 11/1999 | Hachino et al. |
| 6,535,855 B1 | 3/2003 | Cahill et al. |

(Continued)

FOREIGN PATENT DOCUMENTS

| | | |
|---|---|---|
| CA | 2246603 C | 4/2002 |
| CA | 2884450 C | 9/2018 |

(Continued)

OTHER PUBLICATIONS

Lewis, T. L. et al., "Intelligent Systems for Identifying Transactions Associated with an Institution Impacted by an Event," U.S. Appl. No. 16/736,594, filed Jan. 7, 2020, 52 pages.

*Primary Examiner* — Azam A Ansari

(57) ABSTRACT

A transaction processing system capable of processing transactions and implementing a flexible circuit breaker process during a cyber event. A circuit breaker module initiates a circuit breaker event (CBE), an account identification module identifies one or more affected accounts, and a rule generation module generates conditional rules for evaluating each transaction presented to a transaction processing module. If a transaction presented to the transaction processing module satisfies the conditional rule, the transaction is not processed. Transactions not processed are stored in memory and groups of impacted transactions are assigned to resource modules based on common characteristics. The resource module determines if impacted transactions should be allowed to process. A message notification module monitors and receives notifications and updates a dashboard display to allow users to visualize the impact of a cyber event.

14 Claims, 15 Drawing Sheets

(56) References Cited

U.S. PATENT DOCUMENTS

| | | |
|---|---|---|
| 7,398,291 B2 | 7/2008 | Osias |
| 7,536,326 B2 | 5/2009 | Tyson-Quah |
| 7,539,746 B2 | 5/2009 | Bankier et al. |
| 7,756,782 B2 | 7/2010 | Monroe et al. |
| 8,005,737 B2 | 8/2011 | Hammad |
| 8,099,379 B2 | 1/2012 | Morimura et al. |
| 8,156,226 B2 | 4/2012 | Gasca, Jr. et al. |
| 8,290,838 B1 | 10/2012 | Thakur et al. |
| 8,386,371 B2 | 2/2013 | Kittelsen et al. |
| 8,423,466 B2 | 4/2013 | Lane |
| 8,473,415 B2 | 6/2013 | Siegel et al. |
| 8,528,091 B2 | 9/2013 | Bowen et al. |
| 8,667,056 B1 | 3/2014 | Proulx et al. |
| 8,667,120 B2 | 3/2014 | Kurebayashi et al. |
| 8,700,765 B2 | 4/2014 | Yumerefendi et al. |
| 8,732,719 B2 | 5/2014 | Kasten et al. |
| 8,849,776 B2 | 9/2014 | Bingol et al. |
| 8,850,034 B1 | 9/2014 | Amancherla |
| 8,850,575 B1 | 9/2014 | Magi Shaashua et al. |
| 9,043,401 B2 | 5/2015 | Wong et al. |
| 9,167,028 B1 | 10/2015 | Bansal et al. |
| 9,210,185 B1 | 12/2015 | Pinney Wood et al. |
| 9,225,730 B1 | 12/2015 | Brezinski |
| 9,225,737 B2 | 12/2015 | Call et al. |
| 9,348,896 B2 | 5/2016 | Faith et al. |
| 9,369,356 B2 | 6/2016 | Bansal et al. |
| 9,392,007 B2 | 7/2016 | Glokas |
| 9,392,008 B1 | 7/2016 | Michel et al. |
| 9,661,012 B2 | 5/2017 | Michel et al. |
| 9,712,554 B2 | 7/2017 | Hassanzadeh et al. |
| 9,742,788 B2 | 8/2017 | Hassanzadeh et al. |
| 10,110,630 B2 | 10/2018 | McClintock et al. |
| 10,248,910 B2 | 4/2019 | Crabtree et al. |
| 10,290,001 B2 | 5/2019 | Adjaoute |
| 11,042,882 B2 * | 6/2021 | Ledford ............. G06Q 20/4016 |
| 2004/0024626 A1 | 2/2004 | Bruijning |
| 2004/0111398 A1 | 6/2004 | England et al. |
| 2006/0294228 A1 | 12/2006 | Almstrom |
| 2007/0100754 A1 | 5/2007 | Brown |
| 2008/0288382 A1 | 11/2008 | Smith et al. |
| 2009/0112809 A1 | 4/2009 | Wolff et al. |
| 2015/0026027 A1 | 1/2015 | Priess et al. |
| 2015/0339673 A1 | 11/2015 | Adjaoute |
| 2018/0027006 A1 | 1/2018 | Zimmermann et al. |

FOREIGN PATENT DOCUMENTS

| | | |
|---|---|---|
| CN | 100568193 C | 12/2009 |
| CN | 102144220 B | 1/2015 |
| CN | 102684988 B | 2/2015 |
| CN | 106537406 A | 3/2017 |
| CN | 103201724 B | 5/2017 |
| JP | 3974608 B2 | 9/2007 |
| JP | 2008204438 A | 9/2008 |
| JP | 2010182293 A | 8/2010 |
| JP | 6045505 B2 | 12/2016 |
| JP | 6101408 B2 | 3/2017 |
| JP | 6499281 B2 | 4/2019 |
| KR | 101388319 B1 | 4/2014 |
| WO | 2020002216 A1 | 1/2020 |

* cited by examiner

| CBE ID | TRANSACTION SCREENING CRITERIA | CONDITION | VALUE | ACTION |
|---|---|---|---|---|
| COUNTRIES A, B, C CYBER ATTACK | ANY DEBIT ACCOUNT ID | EQUALS | DEBIT ACCOUNT ID ASSOCIATED WITH INSTITUTIONS IN COUNTRIES A, B, C | ROUTE TO COUNTRIES A, B, C INSTITUTION STOP QUEUE |

1104

1106  1108  1110  1112  1114  1116  1118  1120

| ACCOUNT ID | TRANSACTION ID | TRANSACTION SCREENING CRITERIA | MATCH VALUE | STATUS | QUEUE | CURRENCY | PRIMARY GCI |
|---|---|---|---|---|---|---|---|
| 1111-1 | 20191105-0001 | DEBIT ACCOUNT ID EQUALS DEBIT ACCOUNT ID ASSOCIATED WITH INSTITUTIONS IN COUNTRIES A, B, C | COUNTRY A DEBIT ACCOUNT ID | HELD | COUNTRIES A, B, C INSTITUTION STOP QUEUE | USD | 1111 |
| 1234-5 | 20191105-0002 | ANY ACCOUNT ID EQUALS ACCOUNT ID ASSOCIATED WITH PAYMENT SYSTEM USED IN COUNTRIES A, B, C | PAYMENT SYSTEM 123 | REROUTED | COUNTRIES A, B, C PAYMENT STOP QUEUE | EURO | 1234 |

224-1
224-2

| CBE ID | CBE START DATE | TRANSACTION COUNT | STATUS |
|---|---|---|---|
| COUNTRIES A, B, C - CYBER ATTACK | 20190711 | 189 | OPEN |
| BANK ABC SITE HACK | 20190701 | 451 | CLOSED |
| CLIENT FRAUD | 20190811 | 45 | OPEN |
| PAYMENT SYSTEM 123 ATTACK | 20191105 | 601 | CLOSED |

| | | | |
|---|---|---|---|
| 601 TOTAL PAYMENTS IMPACTED | $13,995,514 TOTAL VALUE OF IMPACTED PAYMENTS | 600 ACCOUNTS WITH IMPACTED TRANSACTIONS - TOTAL | 583 CLIENTS WITH IMPACTED TRANSACTIONS - TOTAL |
| 501 PAYMENTS HELD | $9,384,417 TOTAL VALUE OF HELD PAYMENTS | 500 ACCOUNTS WITH IMPACTED TRANSACTIONS - HELD | 450 CLIENTS WITH IMPACTED TRANSACTIONS - HELD |
| 84 PAYMENTS RELEASED | $3,864,398 TOTAL VALUE OF RELEASED PAYMENTS | 84 ACCOUNTS WITH IMPACTED TRANSACTIONS - RELEASED | 566 CLIENTS WITH IMPACTED TRANSACTIONS - RELEASED |
| 17 PAYMENTS CANCELLED | $2,377,039 TOTAL VALUE OF CANCELLED PAYMENTS | 17 ACCOUNTS WITH IMPACTED TRANSACTIONS - CANCELLED | 17 CLIENTS WITH IMPACTED TRANSACTIONS - CANCELLED |

| CBE ID | CBE START DATE | TRANSACTION COUNT | STATUS |
|---|---|---|---|
| COUNTRIES A, B, C - CYBER ATTACK | 20190711 | 189 | OPEN |
| BANK ABC SITE HACK | 20190701 | 451 | CLOSED |
| CLIENT FRAUD | 20190811 | 45 | CLOSED |
| PAYMENT SYSTEM 123 ATTACK | 20191105 | 601 | CLOSED |

| | | | |
|---|---|---|---|
| 601 TOTAL PAYMENTS IMPACTED | $13,995,514 TOTAL VALUE OF IMPACTED PAYMENTS | 600 ACCOUNTS WITH IMPACTED TRANSACTIONS - TOTAL | 583 CLIENTS WITH IMPACTED TRANSACTIONS - TOTAL |
| 400 PAYMENTS HELD | $7,884,147 TOTAL VALUE OF HELD PAYMENTS | 400 ACCOUNTS WITH IMPACTED TRANSACTIONS - HELD | 200 CLIENTS WITH IMPACTED TRANSACTIONS - HELD |
| 184 PAYMENTS RELEASED | $6,234,315 TOTAL VALUE OF RELEASED PAYMENTS | 83 ACCOUNTS WITH IMPACTED TRANSACTIONS - RELEASED | 176 CLIENTS WITH IMPACTED TRANSACTIONS - RELEASED |
| 27 PAYMENTS CANCELLED | $3,377,039 TOTAL VALUE OF CANCELLED PAYMENTS | 127 ACCOUNTS WITH IMPACTED TRANSACTIONS - CANCELLED | 142 CLIENTS WITH IMPACTED TRANSACTIONS - CANCELLED |

INTELLIGENT SYSTEMS FOR IDENTIFYING TRANSACTIONS ASSOCIATED WITH AN INSTITUTION IMPACTED BY AN EVENT USING A DASHBOARD

TECHNICAL FIELD

The present disclosure relates generally to transactions security, and more specifically to intelligent systems for identifying transactions associated with an institution impacted by an event using a dashboard.

BACKGROUND

Payment transaction processing between large institutions is commonly automated and once settled are irrevocable in the majority of the cases. Large institutions have a global footprint with branches in many countries, resulting in thousands of individual transactions between thousands of accounts that are potentially worth multi-billion dollars in a single day. Transactions between large institutions are conducted many times over the course of a day over multiple transaction systems and can include other institutions and intermediary institutions. Most of the time, transactions between two institutions process automatically with no issues. However, cyber events including site hacking, fraud, system attacks and other cyber events can disrupt the normal processing of transactions, causing institutions to pause transaction processing until the cyber event is controlled. Additional risks may include liquidity risks imposed on institutions by clients or other institutions that are becoming or have become insolvent.

SUMMARY

The system disclosed in the present application provides a technical solution to the technical problems discussed above by providing a variable circuit breaker with a dashboard display. The disclosed system provides several practical applications and technical advantages which include 1) a system for identifying impacted institutions or impacted accounts in an institution based on an event (e.g., cyber event or liquidity risk) affecting another institution; 2) a system for allocating resources to groups of transactions to make a decision for that group based on a common characteristic of all transactions in that group, 3) a system capable of stopping and resuming outgoing transactions and quarantining a suspicious incoming transaction; 4) a system for isolating and restricting incoming/outgoing transactions at the processing level or the institution level; 5) a system for quantifying transaction security across a network; 6) a system for providing insight into overall impact on transactions as a result of a circuit breaker event (CBE); 7) a system for enabling a user to view/search for transactions held in a CBE, 8) a system for enabling a user to release or cancel transactions, 9) a system for supporting a client base during prolonged outage, and 10) a system that provides centralized information dissemination and transparency about an outgoing event within the enterprise.

In one embodiment, a transaction processing system associated with an institution is communicatively coupled to a network for communicating with a plurality of external institutions, such as an external payment network. The transaction processing system comprises a memory storing identifying information associated with the plurality of external institutions, a network communication module implemented by one or more hardware processors and configured to receive transactions from the external institutions and a transaction processing module implemented by the one or more hardware processors and configured to receive and process transactions received from the external institutions. The identifying information may include account information (e.g., account numbers or account IDs), bank routing numbers, demand deposit account (DDA) information, country codes, payment initiation source information, payment rail information, and the like. The transaction processing system further comprises a circuit break system. A circuit breaker module implemented by one or more hardware processors is configured to identify an impacted institution and one or more matching parameters that identify that impacted institution or an underlying event.

A parameter matching module implemented by the one or more hardware processors is configured to identify payments that match these parameters. Each parameter is associated with an institution that is impacted by the CBE.

A rule generation module implemented by the one or more hardware processors is configured to generate a conditional rule. The rule generation module receives the parameters from the parameter matching module and generates a conditional rule to prevent processing of a transaction based on transaction screening criteria. The conditional rule is associated with the one or more parameters associated with the impacted institution and based on the transaction type associated with the event type.

A transaction processing module implemented by the one or more hardware processors is configured to receive the conditional rule and compare transaction information with the transaction screening criteria for each transaction received from the external institutions. If the transaction information does not satisfy one or more conditions of the conditional rule, the transaction processing module processes the transaction.

If the transaction information satisfies the condition, the transaction processing module sends the transaction to an impacted transaction memory for storage as an impacted transaction.

Impacted transactions are assigned to groups and each group is assigned to a resource module. A resource allocation module is configured to determine a common characteristic of the transaction information for a plurality of impacted transactions and assign the plurality of impacted transactions to a group in a plurality of groups based on the common characteristic. A common characteristic could be, for example, a country code referenced in the transaction information, a position of the impacted institution referenced in the transaction information, a transaction processing system referenced in the transaction information, or a transaction direction.

One or more of the resource modules are configured to determine, for a group of impacted transactions, if impacted transactions in the group should be processed based on the common characteristic and an event type. If the resource module determines an impacted transaction should be processed, the impacted transaction is returned to the transaction processing module for processing.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 11 is a simplified diagram of transaction information for multiple account IDs associated with a CBE;

FIG. 13 is a simplified diagram of a dashboard display, illustrating exemplary transaction information for impacted transactions associated with a CBE according to one embodiment of a CB transaction managing system;

FIG. 16 is a simplified diagram of the dashboard display of FIG. 14 with updated information, illustrating one embodiment of a CB transaction managing system.

DETAILED DESCRIPTION

Embodiments disclosed herein may best be understood in the context of providing transaction security to a set of institutions in a network. A financial network is an example of a network, in which millions of entities (including people, small businesses and other entities with individual accounts) want to exchange money. Each entity account is tied to a large institution and large institutions exchange money with other large institutions using various payment rails. For purposes of this disclosure, large institutions may include any institution sending and receiving wholesale transactions with other large institutions. Transactions between large institutions can involve multiple countries and currencies, and involve other institutions. Those skilled in the art will appreciate embodiments may be applied to other institutions and transactions as well.

Overview of Transaction Process

Figure 1:
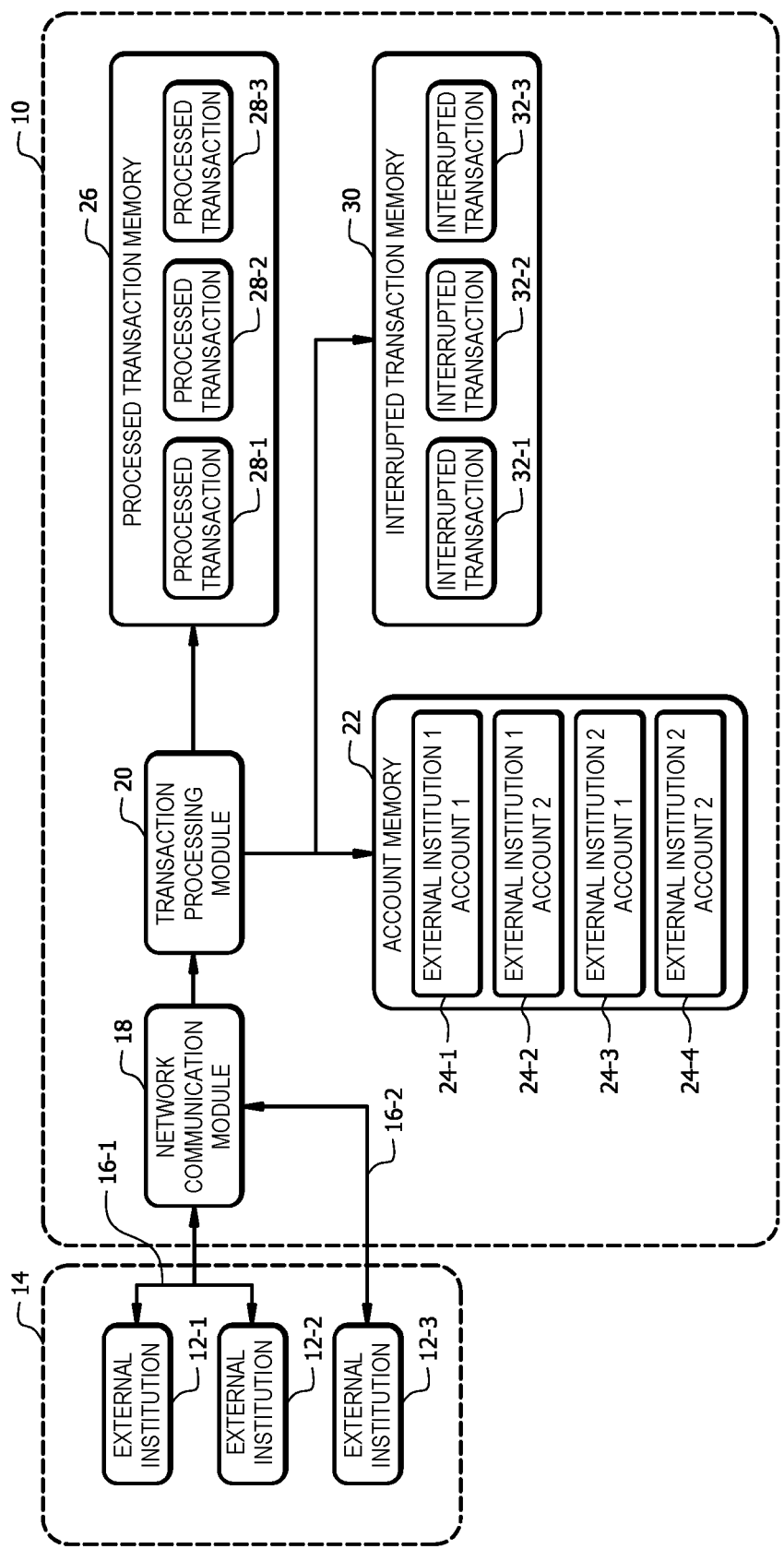
FIG. 1 is a simplified architectural diagram of an exemplary transaction system involving multiple external institutions and multiple transaction processing systems.

FIG. 1 is a simplified architectural diagram of an exemplary transaction system involving multiple external institutions and multiple payment systems. As depicted in FIG. 1, institution 10 communicates with multiple external institutions 12-1, 12-2, 12-3 in network 14. Institution 12-1 and 12-2 may communicate transactions via first payment system 16-1 to network communication module 18 and institution 12-3 may communicate transactions via second payment system 16-2 to network communication module 18.

Communications between institution 10 and external institutions 12-1, 12-2 may be coordinated through network communication module 18. Network communication module 18 receives communications from institutions 12-1, 12-2 and 12-3 and communicates with account memory 22 to identify an account 24 from a plurality of accounts 24. Large institutions such as banks typically have multiple accounts. Each account serves a particular purpose and each institution has a set of rules for processing transactions associated with each account. For example, a first account may be associated with a payment system, and the institution defines a set of rules for processing transactions received via the first account. A second account may be associated with a second payment system and transactions received via the second payment system are processed by a second set of rules. Each set of rules may define how transactions are processed, including defining message types and message formats. In a financial transaction system for example, a set of rules may specify a transaction settlement system (e.g., deferred net settlement (DNS) or real time gross settlement (RTGS)), a central bank, clearinghouse, or other intermediary) necessary or required by a government or agreement between institutions. As depicted in FIG. 1, account identifiers (IDs) 24-1, 24-2 may be associated with a first external institution and account IDs 24-3, 24-4 may be associated with a second external institution. First account ID 24-1 may be identified as a debit account, second account ID 24-2 may be identified as a credit account, third account ID 24-3 may be associated with a first payment system and fourth account ID 24-4 3 may be associated with a second payment system.

Account information, such as account IDs and account numbers, are one type of parameter used to identify institutions that may be impacted by an event or subject to a liquidity risk. Subsequent payment transactions that match these parameters can then be identified and quarantined and/or prevented from being completed by an institution. Other parameters that may be used include, but are not limited to, bank routing numbers, demand deposit account (DDA) information, country codes, payment initiation source information, payment rail information, and the like. Thus, where examples are provided herein regarding account information (e.g., account IDs), it should be understood that any number and combination of these other types of information may be used in addition to or in place of account information.

Transaction processing module 20 processes external institution transactions received via network communication module 18 as well as internally routed transactions and transactions originating from institution 10. Transaction processing module 20 processes transactions based on rules corresponding to an account identified in the transaction information. Under normal operations, transaction processing module 20 processes transactions received from network communication module 18 and processed transaction memory 26 stores processed transactions 28-1, 28-2, 28-3.

As depicted in FIG. 1, if transaction processing is interrupted, transaction processing module 20 is configured to not process any transactions and send all interrupted transactions 32-1, 32-2, 32-3 to impacted transaction memory 30. This can be problematic in certain environments. For example, in many financial transaction environments, if a transaction is not processed within a predetermined time period (such as by an end of day (EOD) time), the transaction is cancelled.

Cyber Events and Liquidity Risk

One possible cause for interrupting transaction processing is a cyber event, which refers to any event relayed by electronic transmission that can disrupt, crash, corrupt or otherwise compromise the integrity of transactions between two or more institutions. Examples of cyber events include, but are not limited to, site hacks, fraud, cyber espionage, malware infiltration, data exfiltration and system attacks. If an institution suspects it may be the subject of a cyber event, efforts to mitigate the effects of the cyber event include notifying other institutions and requesting a circuit breaker as quickly as possible. Referring to FIG. 1, if any of external institutions 12 send a request to interrupt processing (also commonly referred to as a "circuit break request," a "circuit breaker" or simply a "circuit break,") to institution 10 and a circuit break process is initiated, transaction processing is interrupted and interrupted transactions 32 are not processed until the cyber event is neutralized and external institution 12 communicates a message to release the transactions and end the circuit break process. This stoppage of transaction processing can quickly expand the effects of the cyber event to affect multiple institutions 12 with thousands of accounts.

In addition to cyber events, liquidity risks imposed on institutions by clients or other institutions that are becoming or have become insolvent may also serve as a trigger to interrupt a transaction. For example, if an institution suspects that it may become subject to a liquidity risk, it may notify other institutions and request a circuit breaker request. Thus, where examples are provided herein regarding triggering a circuit breaker event based on a cyber event, it should be understood that any number and combination of other liquidity risks may also be used to trigger a circuit breaker event in addition to or in place of a cyber event.

Circuit Breaker Request

Transaction processing systems disclosed herein solve the technical issues of implementing a circuit breaker using an elastic circuit breaker. Instead of implementing a rigid interruption, embodiments initiate an elastic circuit breaker event (CBE) to identify transactions impacted by the circuit breaker event, process non-impacted transactions from impacted transactions, and resolve impacted transactions. Embodiments update transaction screening criteria such that the transaction processing system adjusts to new information.

Figure 2:
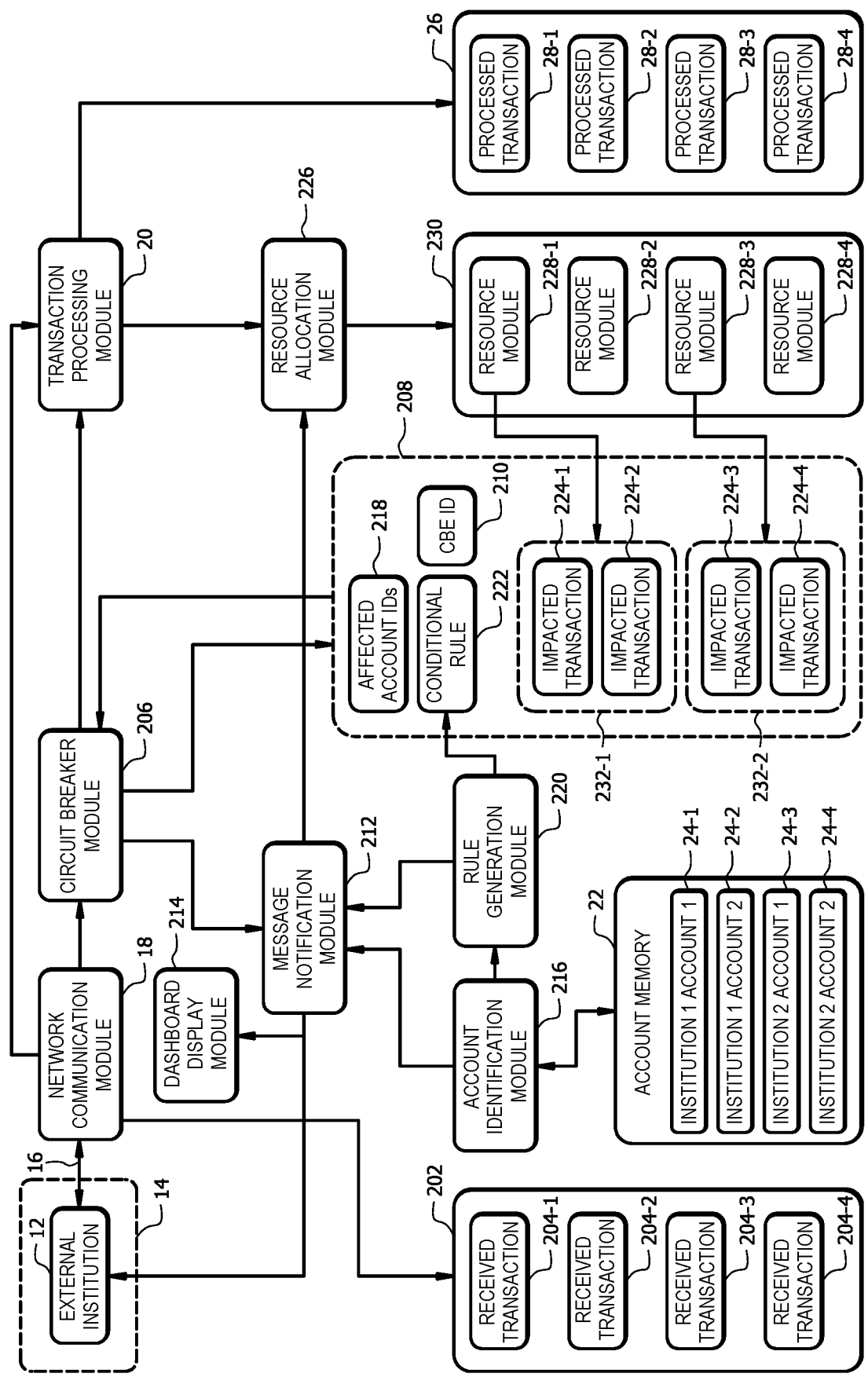
FIG. 2 is a simplified architectural diagram of an embodiment of the transaction system of FIG. 1, with an elastic circuit breaker (CB) system and a dashboard control system.

FIG. 2 is a simplified architectural diagram of an embodiment of the transaction processing system of FIG. 1, further comprising an elastic circuit breaker (CB) system. Similar to the exemplary transaction processing system depicted in FIG. 1, network communication module 18 sends and receives communications from institutions 12-1 and 12-2. However, as network communication module 18 receives communications from the plurality of external institutions 12, network communication module 18 communicates with received transaction memory 202 to store a copy of received transactions 204. In a financial transaction environment, financial transaction communications from external institutions 12 are in a preset format and embodiments disclosed herein are operable to uncompress each file, load files in batches and store batches of received transactions 204-1, 204-2, 204-3, 204-4 in received transaction memory 202 in near real-time. Transactions 204 may be stored in a schema to enable users to search for selected transactions 204.

Figure 3:
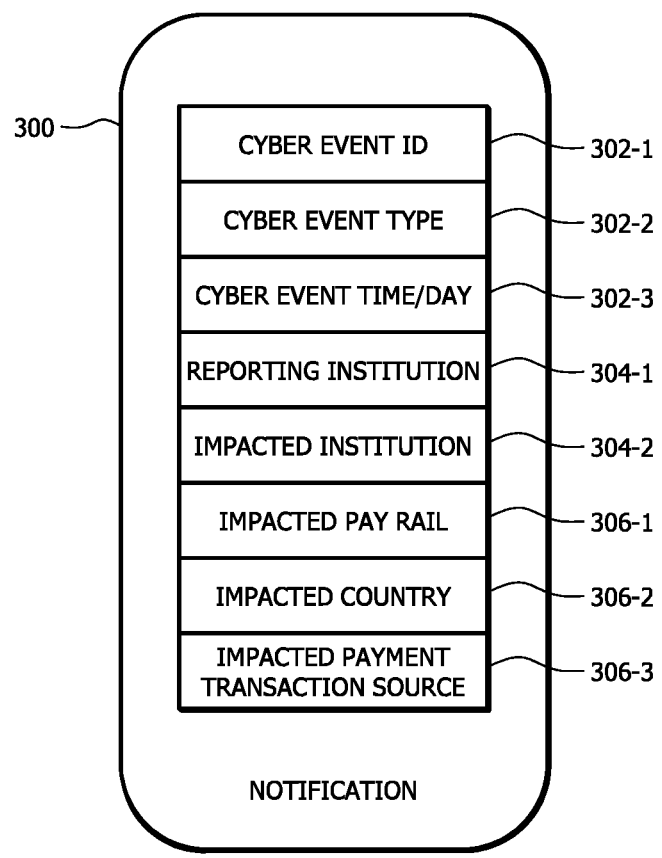
FIG. 3 is a simplified depiction of a cyber event notification used to initiate a circuit breaker event (CBE)
Figure 4:
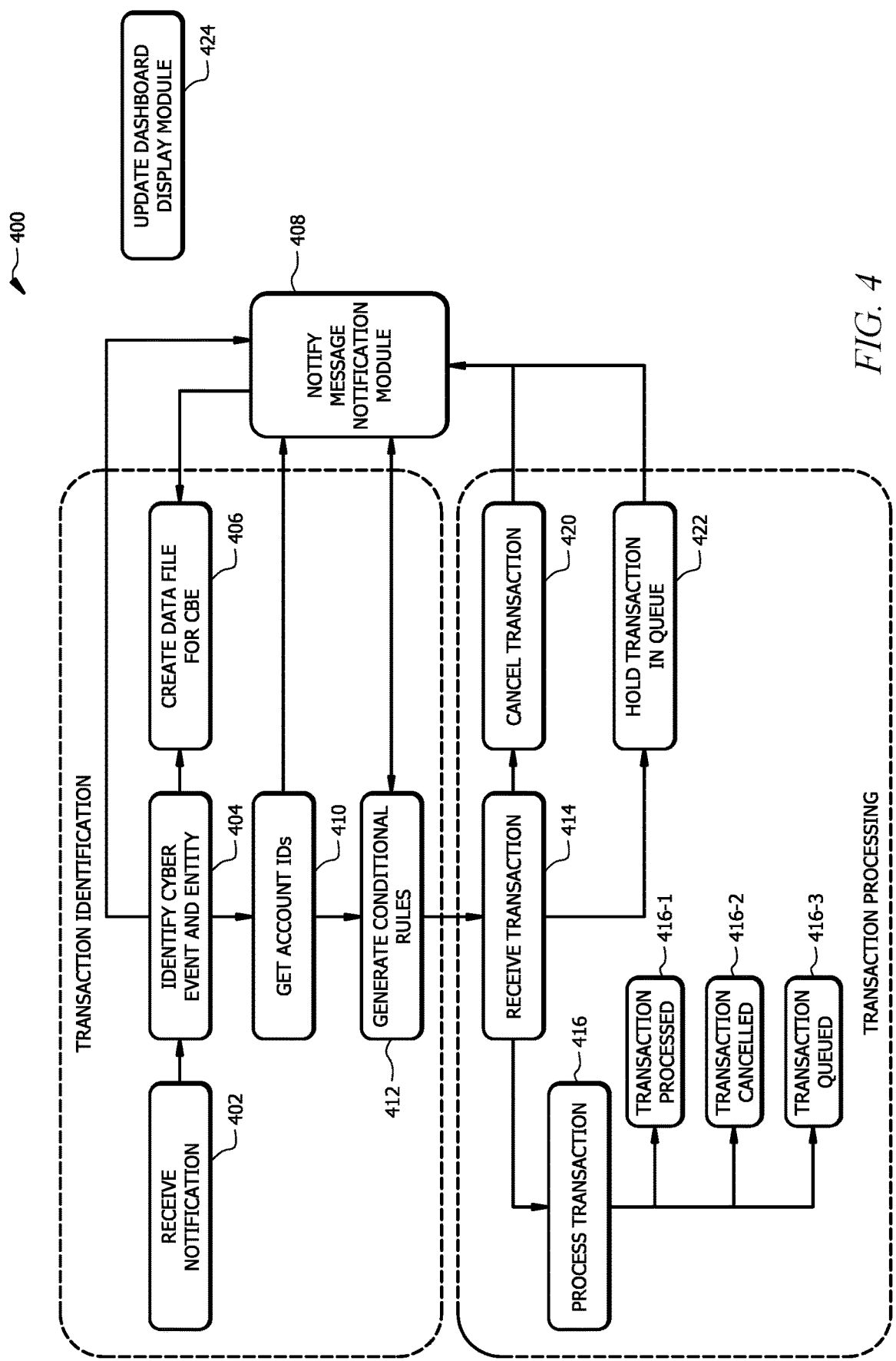
FIG. 4 is a flowchart of a process for managing transaction processing during a CBE.

When a cyber event notification is received, embodiments initiate an elastic circuit breaker event (CBE) for identifying transactions impacted by the circuit breaker event, for processing non-impacted transactions from impacted transactions, and for resolving impacted transactions. Referring to the transaction processing system depicted in FIG. 2, an exemplary cyber event notification in FIG. 3, and a flowchart depicted in FIG. 4, transaction identification begins at step 402 when network communication module 18 receives cyber event notification 300.

In some embodiments, at step 404, circuit breaker (CB) module 206 is configured to identify, from cyber event notification 300, cyber event information such as cyber event ID 302-1, cyber event type 302-2 and cyber event time/day 302-3 (collectively referred to as cyber event information 302), identify institution information such as reporting institution 304-1 and impacted institution 304-2 (collectively referred to as institution information 304), and identify transaction information such as an impacted currency 306-1, an impacted country 306-2 or an impacted transaction payment system 306-3 (collectively referred to as transaction information 306). Cyber event notification 300 may include all or portions of cyber event information 302, institution 304 and transaction information 306. For example, if a cyber event ID 302-1 is not provided, institution 10 may create cyber event ID 302-1. Cyber event notification 300 is not limited to the information depicted in FIG. 3 and may include additional information as well.

At step 406, embodiments of circuit breaker (CB) module 206 create CBE data file 208 and store CBE ID 210 in CBE data file 208. CBE ID 208 may include cyber event information 302, institution information 304 and transaction information 306.

In some embodiments, at step 408, CB module 206 sends a notification to message notification module 212 and message notification module 212 sends a notification to create circuit breaker event (CBE) data file 208 and assign CBE ID 210 to CBE data file 208. In some embodiments, message notification module 212 is communicatively coupled to a memory storing a plurality of message templates, wherein each message template is associated with a cyber event type, an institution or an entity.

At step 410, embodiments of account identification module 216 identify account identifiers (IDs) for a set of impacted accounts in account memory 22 based on the institution and the cyber event. Institutions such as multi-national banks may have thousands of accounts worldwide, but not all accounts will be affected by every cyber event. In some embodiments, account memory 22 stores a data structure including a Global Client Identifier (GCI) and a tree of all the hierarchical identifiers associated with the GCI. In some embodiments, account identification module 216 uses information from cyber event notification 300 and searches for account IDs in the data structure using hierarchical identifiers associated with the GCI. Thus, if a cyber event is associated with only certain countries, embodiments may receive the GCI and search the tree to identify only those account IDs associated with the selected countries. In some embodiments, account identification module 204 communicates an impacted account identifier (ID) 218 for each affected account to CBE data file 208. In some embodiments, account identification module 204 communicates an account identifier (ID) 218 for each affected account to message notification module 212 and message notification module 212 communicates the account identifier (ID) 218 for each affected account to CBE data file 208 and determines the number of account IDs 218.

At step 412, rule generation module 220 generates one or more conditional rules 222 corresponding to CBE ID 210 and one or more affected account IDs 218. In some embodiments, rule generation module 220 communicates with circuit breaker module 206 to get cyber event information 302 and communicates with account identification module 216 to receive affected account IDs 218. In other embodiments, rule generation module 220 communicates with message notification module 212 to get the affected account IDs 218, CBE ID 210 and a storage location of CBE data file 208. Rule generation module 206 generates one or more conditional rules 222 and communicates conditional rule 222 to CBE data file 208. Each conditional rule 222 is structured with one or more transaction screening criteria, a condition, a transaction value and an action. In some embodiments, rule generation module 220 sends a conditional rule notification to message notification module 212 and conditional rule 22 is added to the set of processing rules used by transaction processing module 20. Each conditional rule 222 is used to identify impacted transactions 224 based on the one or more transaction criteria.

At step 414, transaction processing module 20 compares transaction information against transaction screening criteria in conditional rules 222 for each transaction.

Steps 416-1, 416-2 and 416-3 refer to the possible outcome for each transaction presented to transaction processing module 20. At step 416-1, if the transaction value in a transaction does not match the transaction screening criteria such that the transaction does not satisfy the condition of conditional rule 222, the transaction is processed. Transaction processing module 20 sends processed transactions 28-1 to processed transaction memory 26. At step 416-2, conditional rule 222 may be structured such that if the transaction value matches the transaction screening criteria such that the transaction satisfies a condition of conditional rule 222, a transaction may be cancelled. In some embodiments, cancelled transactions are stored in CBE data file 208 as impacted transactions 224 and transaction processing module 20 sends a cancelled transaction notification to message notification module 212. Message notification module 212 tracks information related to impacted transactions 224 that are cancelled. It should be noted that cancelling all transactions is not desirable since it is not known if the transaction should be cancelled. At step 416-3, conditional rule 222 may be structured such that if the transaction value matches the transaction screening criteria such that the transaction satisfies a condition of conditional rule 222, the transaction is sent to a queue as an impacted transaction 224. In some embodiments, impacted transactions 224 are stored in CBE data file 208 and transaction processing module 20 sends an impacted transaction notification to message notification module 212. Message notification module 212 tracks information related to impacted transactions 224 that are held in CBE data file 208 and updates dashboard display module 214 at step 424. Process 400 continues until the circuit breaker event is closed.

If a cyber event targets a small number of accounts and is easy to detect, an institution impacted by the cyber event may be able to identify all affected account IDs 218 easily such that the cyber event is quickly controlled and impacted transactions 224 can be sent back to transaction processing module 20, where they can be processed and stored as processed transactions 28. However, if a cyber event is sophisticated, detection of the cyber event, identification of affected institutions and account IDs, and determining impacted transactions may take time. Sophisticated cyber events can impact multiple institutions, affecting thousands of accounts and thousands of transactions.

Figure 5:
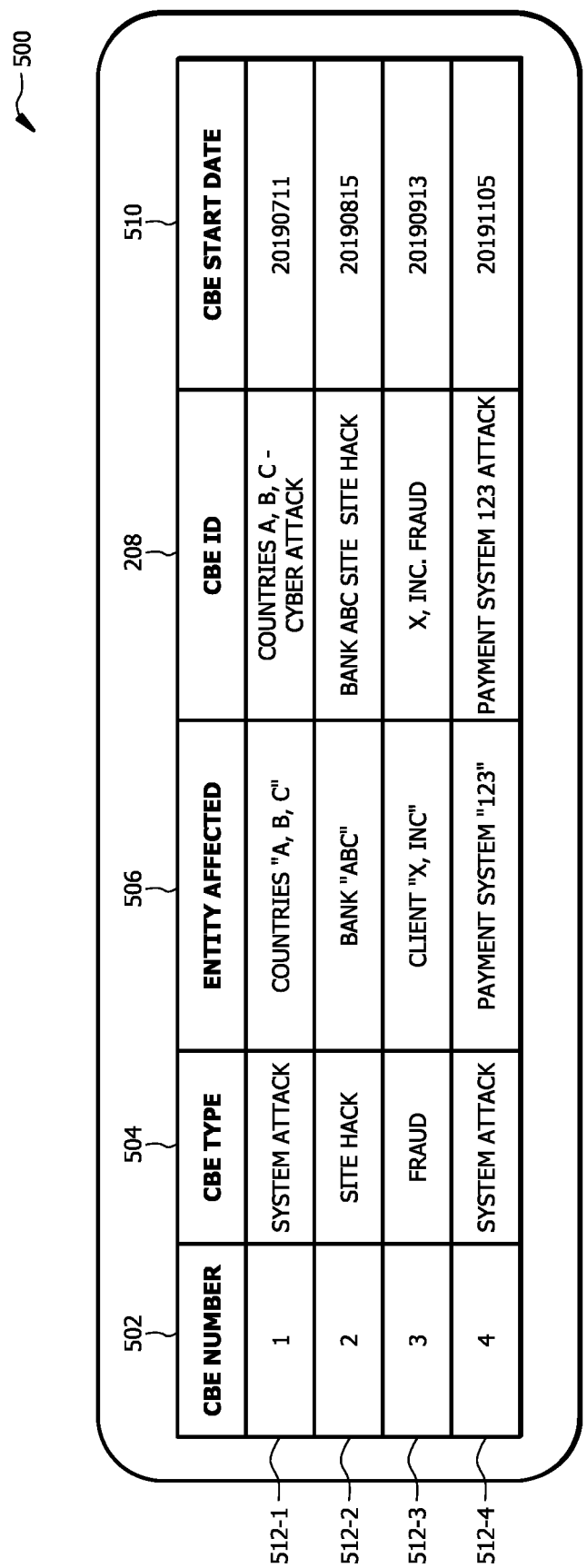
FIG. 5 is a simplified diagram illustrating exemplary CBE details for one embodiment of a CB transaction managing system.

Embodiments disclosed herein allow users to visualize data associated with circuit breaker events. Embodiments of message notification module 212 are configured to communicate with dashboard display module 214 to display CBE information. In some embodiments, when cyber event notification 300 is received, circuit breaker module 206 communicates CBE ID 210 to message notification module 212 and message notification module 212 communicates information to dashboard display module 214. FIG. 5 depicts a simplified display 500 of exemplary CBE details 512 for one embodiment of a CB transaction managing system, including CBE number 502, CBE type 504, entity affected 506, CBE ID 208 and CBE start date 510 for each CBE. Information sent to dashboard display module 214 comprises rows 512-1, 512-2, 512-3, 512-4 and 512-5 corresponding to five cyber events, with each row 512 displaying an associated CBE number 502 (e.g., "1" for row 512-1) associated with CBE type 504 (e.g., "SYSTEM ATTACK" for row 512-1), an entity affected (e.g., "COUNTRIES A, B and C" for row 512-1), CBE ID 208 (e.g., "COUNTRIES A, B, C SYSTEM ATTACK" for row 512-1) and CBE start date 510 (e.g., "20190711" for row 512-1). CBE ID 208 depicted in FIG. 5 may be generated by circuit breaker module 206 based on the cyber event type and the entity (or entities) affected. The capability of embodiments to display information in near real-time for a plurality of cyber events allows users to see trends and identify more sophisticated attacks.

Figure 6:
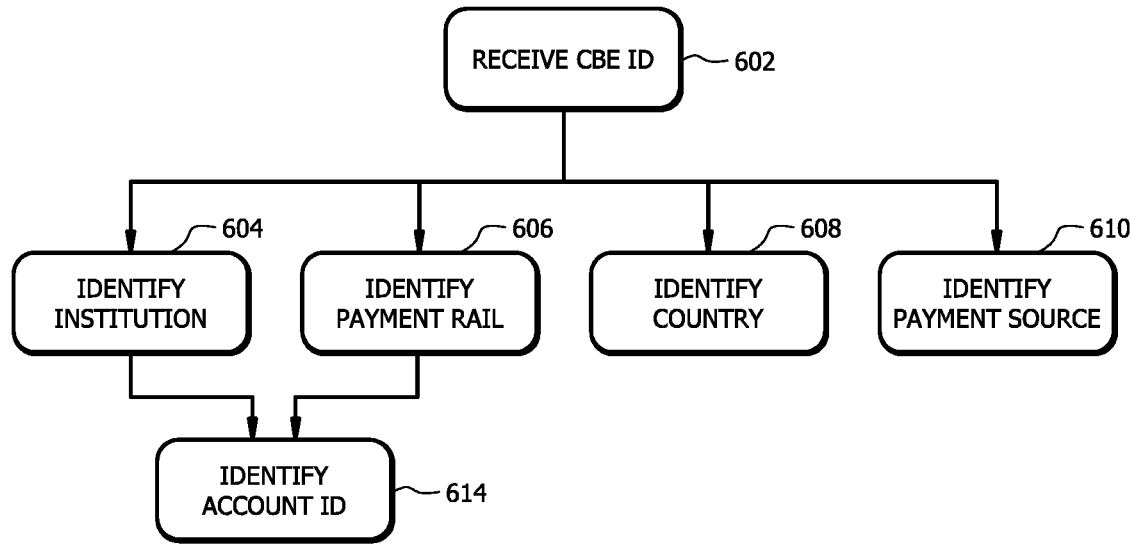
FIG. 6 is a simplified flowchart of a process for identifying account IDs for accounts affected by a CBE.

FIG. 6 depicts a flowchart of process 600 used to identify affected account IDs 218. Process 600 starts at step 602 when CBE ID 210 is received by account identification module 216.

At step 604, account identification module 216 searches accounts 24 in memory 22 to identify affected account IDs based on an institution.

At step 606, account identification module 216 searches accounts 24 in memory 22 to identify affected account IDs based on a payment rail.

At step 608, account identification module 216 searches accounts 24 in memory 22 to identify affected account IDs based on a country.

At step 610, account identification module 216 searches accounts 24 in memory 22 to identify affected account IDs based on a payment source.

For example, if cyber event notification 300 is associated with a financial institution operating in countries A, B and C, embodiments of account identification module 216 may determine the cyber event is a system attack on transactions involving entities (including institutions) in countries A, B and C or involving transaction payment system "123" associated with countries A, B, C. Steps 604, 606, 608 and 610 may be performed serially or in parallel. Process 600 ends at step 614 when account identification module 216 has identified all affected account IDs 218.

Figure 7:
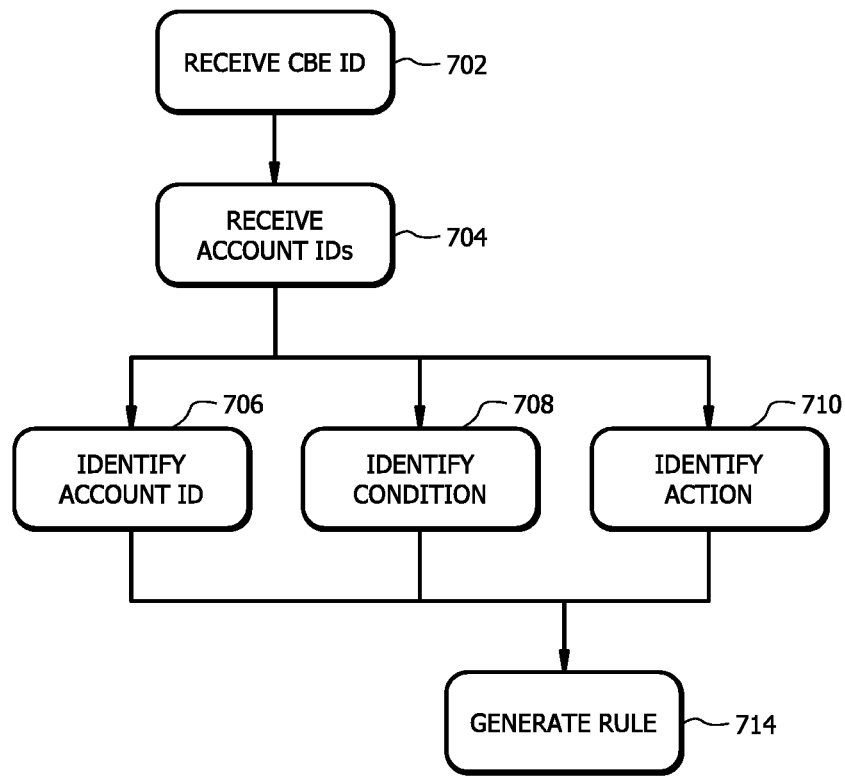
FIG. 7 is a simplified flowchart of a process for generating a conditional rule to identify transactions associated with account IDs affected by a CBE.

FIG. 7 depicts a flowchart of process 700 used to generate rules 222 for evaluating transactions. Process 700 begins at step 702 when CBE ID 210 is received by rule generation module 220. Alternatively, process 700 may begin when message notification module 212 sends cyber event information to rule generation module 220.

At step 704, rule generation module 220 receives affected account IDs 218 from account identification module 216 or message notification module 212, or rule generation module 220 retrieves affected account IDs 218 from CBE data file 208.

At step 706, rule generation module 220 identifies transaction screening criteria for evaluating transaction information. Transaction screening criteria may be selected to identify affected account IDs 24. For example, rule generation module 220 may select transaction screening criteria based on account IDs received from account identification module 216 and may include any account ID associated with an entity, any credit side account ID associated with an entity, any debit side account ID associated with an entity, any account ID associated with an entity for a country, any credit side account ID associated with an entity for the country, any debit side account ID associated with an entity for the country, any account ID associated with an entity associated with a payment system, any credit side account ID associated with an entity for the payment system, or any debit side account ID associated with an entity for the payment system. Other transaction information could include a transaction amount or a transaction direction.

At step 708, rule generation module 220 identifies a condition corresponding to the transaction screening criteria. A condition may be that transaction information is less than a value, equals a value, is greater than a value, or is within a range of values. Examples include an account ID equals an account ID associated with the cyber event or that a transaction amount is greater than an amount.

At step 710, rule generation module 220 identifies an action to be taken if transaction information matches the transaction screening criteria. Examples of an action include that the transaction is cancelled or the transaction is stored in an impacted transaction memory.

Process 700 ends at step 714 when one or more conditional rules 22 are generated and communicated to transaction processing module 20 for identifying transactions impacted by circuit breaker event 512 associated with a cyber event. Copies of conditional rules 222 are stored in CBE data file 208 associated with CBE ID 210.

Figure 8:
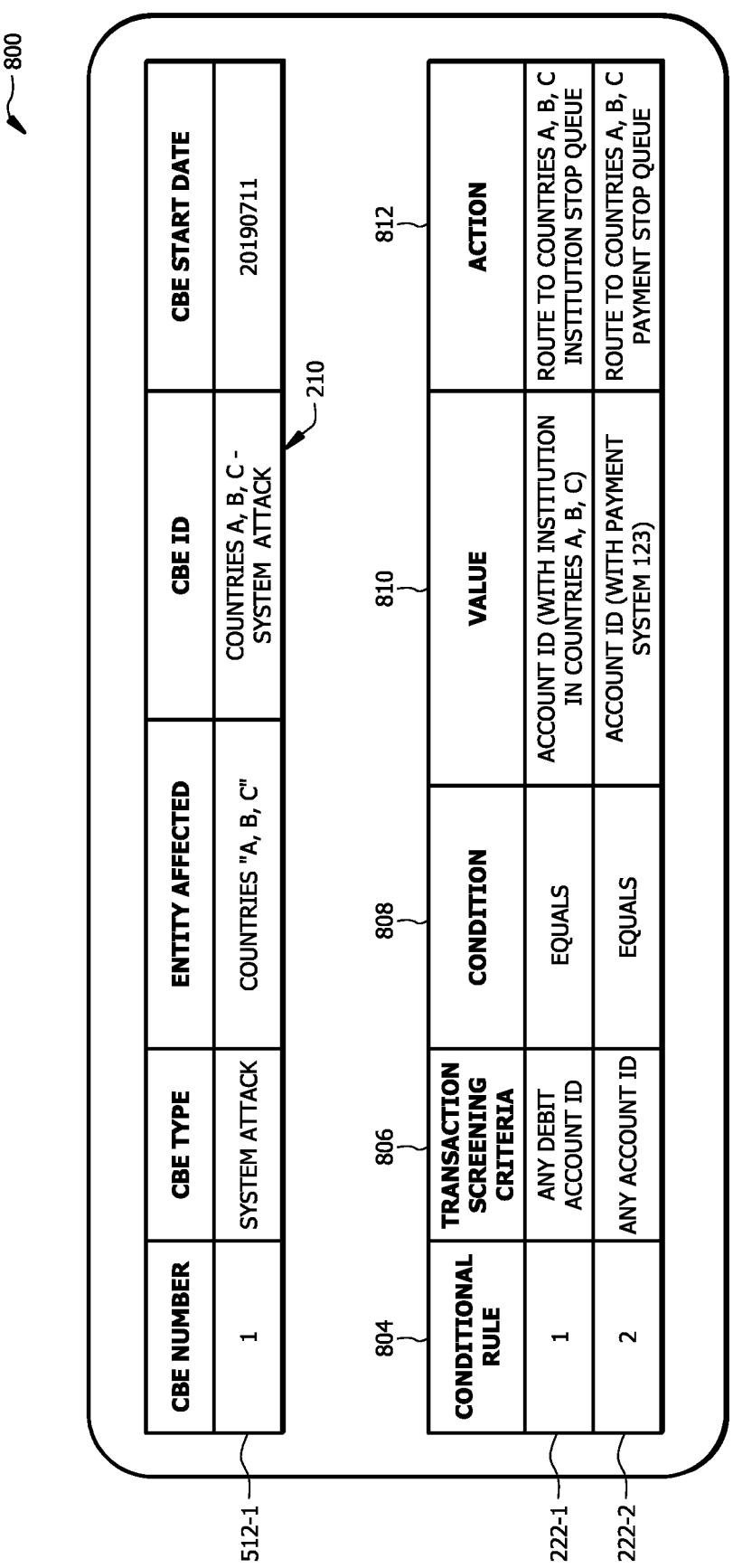
FIG. 8 is a simplified diagram illustrating exemplary conditional rules associated with a CBE.

FIG. 8 depicts a simplified display 800 of exemplary conditional rule details 802 corresponding to CBE 512-1. FIG. 8 depicts conditional rules 222-1, 222-2 corresponding to CBE 210 (e.g., "COUNTRIES A, B, C—SYSTEM ATTACK"). Conditional rule 222-1 is generated to screen transactions based on transaction screening criteria 806 (e.g., "ACCOUNT ID"), condition 808 (e.g., "EQUALS") and value 810 ("DEBIT ACCOUNT ID (FOR INSTITUTION IN COUNTRIES A, B, C")") corresponding to account IDs 24 associated with countries A, B, C. In a transaction, if an account ID equals a debit account ID for an institution in any of countries A, B or C conditional rule 222 specifies that the transaction should be stored in a queue associated with payments made to institutions in any of countries A, B, C (e.g., "ROUTE TO COUNTRIES A_B_C_INSTITUTION_STOP_QUEUE"). Conditional rule 222-2 is generated to screen transactions based on a second set of transaction screening criteria 806 (e.g., "ACCOUNT ID") condition 808 (e.g., "EQUALS") and value 810 (e.g., "ANY ACCOUNT ID (WITH PAYMENT SYSTEM 123") corresponding to account IDs associated with payment system 123. If an account ID equals an account 24 associated with payment system 123, conditional rule 222 specifies that the transaction should be stored in a queue associated with payment system 123 (e.g., "ROUTE TO COUNTRIES A_B_C_PAYMENT_STOP_QUEUE"). A user viewing display 800 can see an impact of a CBE on transactions and an institution.

Figure 9:
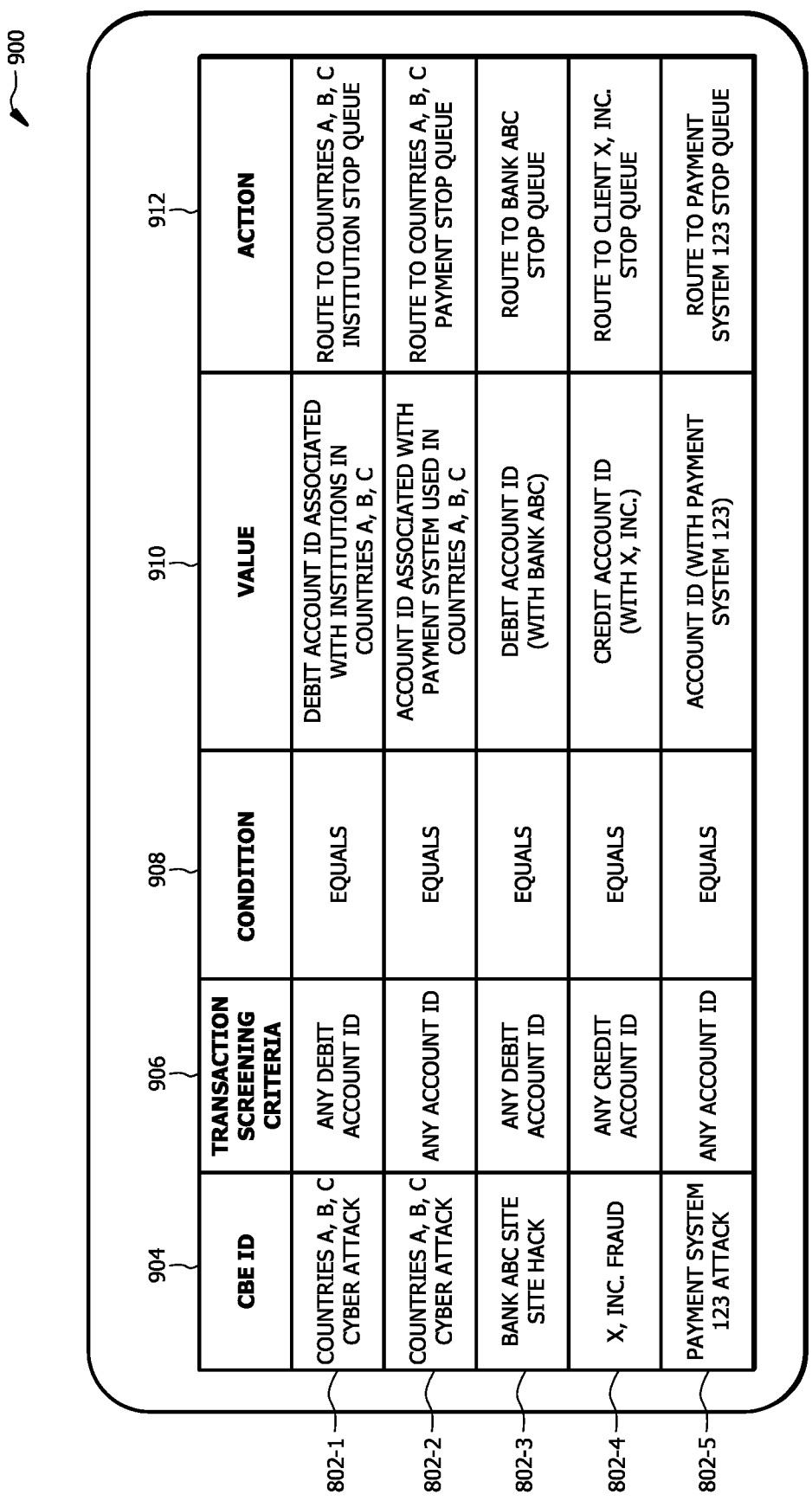
FIG. 9 is a simplified display of conditional rules implemented for multiple CBEs.

FIG. 9 depicts a simplified display 900 of exemplary conditional rules 222 implemented by transaction processing system 200 at any one time. As depicted in FIG. 9, CBE ID column 904 is populated with CBE IDs 208 for each circuit breaker event, transaction screening criteria column 906 is populated with transaction screening criteria 806 for each circuit breaker event, condition column 908 is populated with conditions 808 for each circuit breaker event, transaction value column 910 is populated with transaction values 810 for each circuit breaker event and action column 912 is populated with actions 812 for each circuit breaker event recorded in one or more of rows 802-1, 802-2, 802-3, 802-4 and 802-5.

Some networks have set formats and protocols for communicating between institutions. For example, financial transactions generally have a set format. The format allows for automated processing of transactions by transaction processing module 20, and also allows embodiments to identify transactions impacted by a cyber event.

Figure 10:
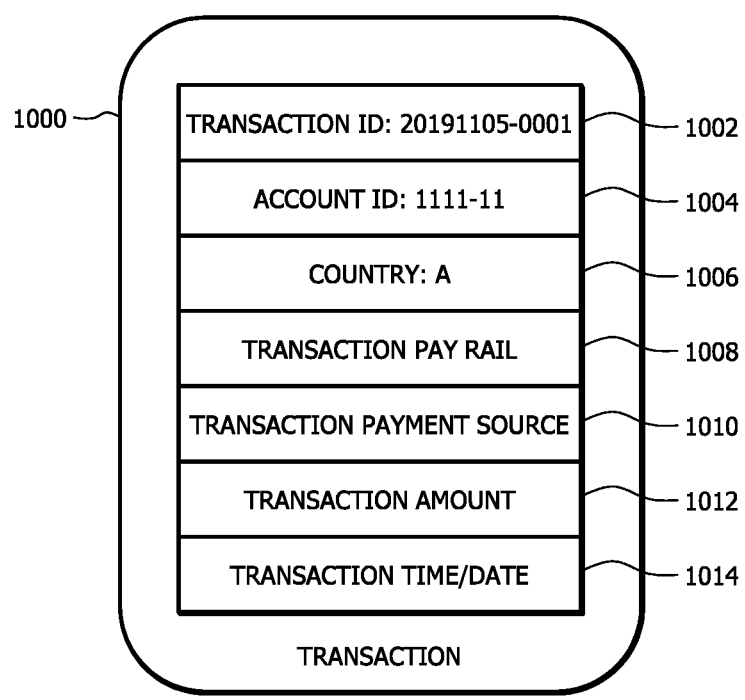
FIG. 10 is a simplified diagram illustrating exemplary transaction information.

FIG. 10 depicts a simplified diagram of a transaction presented for processing to transaction processing module 20. As depicted in FIG. 10, transaction 1000 includes transaction identifier (ID) 1002 (e.g., 20191105-0001), account ID 1004 (e.g., 1111-1), country code 1006 (e.g., "A"), transaction pay rail 1008 (e.g., "USD"), transaction payment source 1010 (e.g., "XYZ"), transaction amount 1012 (e.g., "1.36M") and transaction time/date 1014 (e.g., "1300Z20191105").

Transaction processing module 20 evaluates criteria in transaction 1000 against conditional rules 222 to determine if transaction 1000 should be processed. Transaction processing module 20 is configured to process all transactions in which the transaction screening criteria does not match the transaction value or otherwise satisfy the conditions of any conditional rules 222. Transaction processing module 20 is configured to interrupt all transactions in which the transaction screening criteria matches a transaction value or otherwise satisfies a condition of at least one conditional rule 222. If the transaction information in transaction 1000 does not satisfy the conditions of conditional rules 222, transaction 1000 is processed, but if the transaction information in transaction 1000 satisfies a condition of at least one conditional rule 222, an action is performed on the transaction.

Message notification module 212 sends notifications of impacted transactions 224 associated with a CBE and may include conditional rule information associated with a CBE. Embodiments of message notification module 212 may be configured to send notifications of any impacted transactions 224 automatically cancelled and returned at the end of the business day and any impacted transactions 224 manually released or cancelled. For example, some impacted transactions 224 may be cancelled. In some situations, when an impacted transaction 224 is cancelled or the transaction is held over 2 days, embodiments execute the appropriate return to sender process based on the source of the impacted transactions 224. In some embodiments, message notification module 212 retrieves a message template, populates the template with the sender's information and other information mapped into various fields as per a return to sender (RTS) process, and communicates the message to the sender.

FIG. 11 depicts a simplified display 1100 of exemplary impacted transactions identified by conditional rule 222-1 associated with a circuit breaker event. As depicted in FIG. 11, account ID column 1106 is populated with account ID 1004, transaction ID column 1108 is populated with transaction ID 1002, match criteria column 1110 is populated with match criteria 806, match value column 1112 is populated with a value that satisfied a condition of conditional rule 222-1. Table 1104 includes other information. For example, status column 1114 is populated with a status of impacted transaction 224, queue column 1116 is populated with a storage location of transactions 224-2, currency column 1118 is populated with currency information determined from step 606, and primary global client identifier (GCI) column 1120 is populated with a GCI for identifying a client. In some embodiments, transaction processing module 20 sends an impacted transaction notification to message notification module 212 for each impacted transaction.

Figure 12:
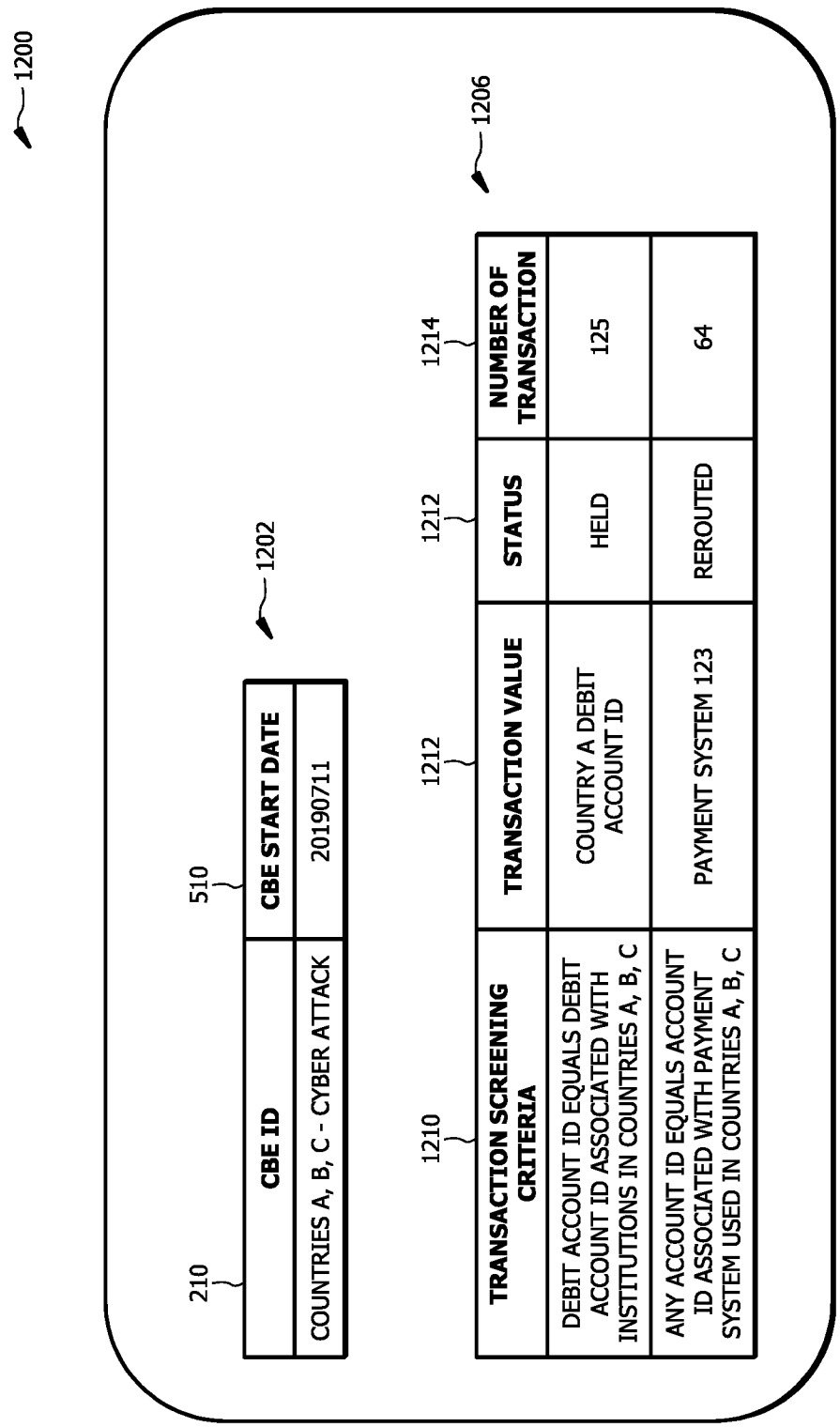
FIG. 12 is a simplified display of impacted transactions, illustrating exemplary transaction criteria for conditional rules according to one embodiment of a CB transaction managing system.

Message notification module 212 is configured to capture information associated with impacted transactions 224. FIG. 12 depicts a simplified display 1200 for displaying CBE information 1202 and table 1206 with information associated with a total number of impacted transactions 224 corresponding to CBE ID 210. Table 1206 includes transaction screening criteria column 1210 indicating transaction screening criteria, match value column 1212 populated with account IDs 218, status column 1212 and column 1214 populated with a total number of impacted transactions 224 associated with each transaction screening criteria. FIG. 12 allows users to see which transaction screening criteria satisfy a condition of at least one conditional rules 222.

Embodiments disclosed herein enable users to visualize an impact of a cyber event on accounts and clients. FIG. 13 depicts a simplified display 1300 for displaying CBE information 1302 identifying one or more circuit breaker events 1304 with CBE IDs 210, CBE start date column 510, transaction count column 1308 indicating a number of impacted transactions 224 and a CBE status column 1310. Table 1312 may include impacted payment column 1314, payment value column 1316, impacted account column 1318 and impacted client column 1320. As depicted in FIG. 13, first row 1324-1 may present total impacted transaction information 1322-1 for a total number of impacted transactions 224 associated with CBE ID 210, total impacted transaction value 1322-2 for a total number of impacted transactions 224 associated with CBE ID 210, total impacted account information 1322-3 for a total number of impacted transactions 224 associated with CBE ID 210 and total number of clients 1322-4 for a total number of impacted transactions 224 associated with CBE ID 210. Similarly, rows 1324-2, 1324-3 and 1324-4 may present impacted transaction information 1322-1 for impacted transactions 224 that are held, released or cancelled, a value 1322-2 for impacted transactions 224 that are held, released or cancelled, account information 1322-3 for impacted transactions 224 associated with CBE ID 210 that are held, released and cancelled and client information 1322-4 for transactions 224 associated with CBE ID 210 that are held, released and cancelled. Embodiments disclosed herein further include resource modules for repairing or resolving impacted transactions 224.

Figure 14:
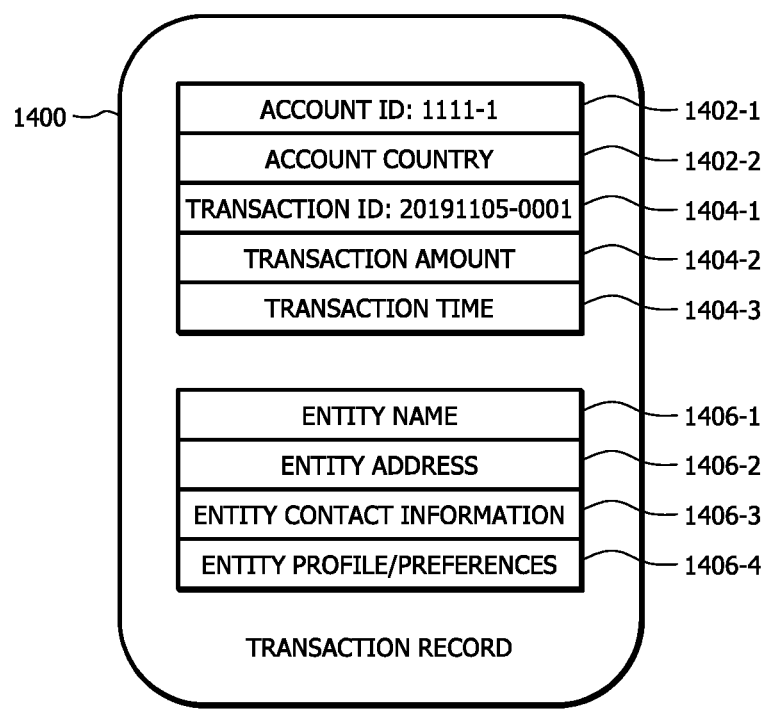
FIG. 14 is a simplified diagram of an impacted transaction record.

When impacted transactions 224 are stored in CBE data file 208, embodiments include additional information. FIG. 14 depicts a simplified diagram of an impacted transaction stored in CBE data file 208. As depicted in FIG. 14, impacted transaction 1400 associated with a system attack on countries A, B and C includes account ID 1402-1, account country information 1402-2 and other account information (collectively referred to as account information 1402), transaction ID 1404-1, transaction amount 1404-2, transaction time 1404-3 (collectively referred to as transaction information 1404), and entity name 1406-1, entity address 1406-2, entity contact information 1406-3 and entity profile/preferences 1406-4 (collectively referred to as entity information 1404).

The number of impacted transactions 224 can quickly affect other accounts, affecting multiple institutions, countries and currencies. For large institutions, this can prevent millions of dollars from being transacted. For example, in financial transaction processing networks, if a transaction is not processed by a certain time, the transaction is cancelled. Accordingly, a financial institution would like to avoid cancelling all transactions each time a cyber event is declared. Embodiments of a circuit breaker system disclosed herein are configured to minimize the effects of a cyber event by reviewing impacted transactions 420 to determine if they should be allowed to process.

Figure 15:
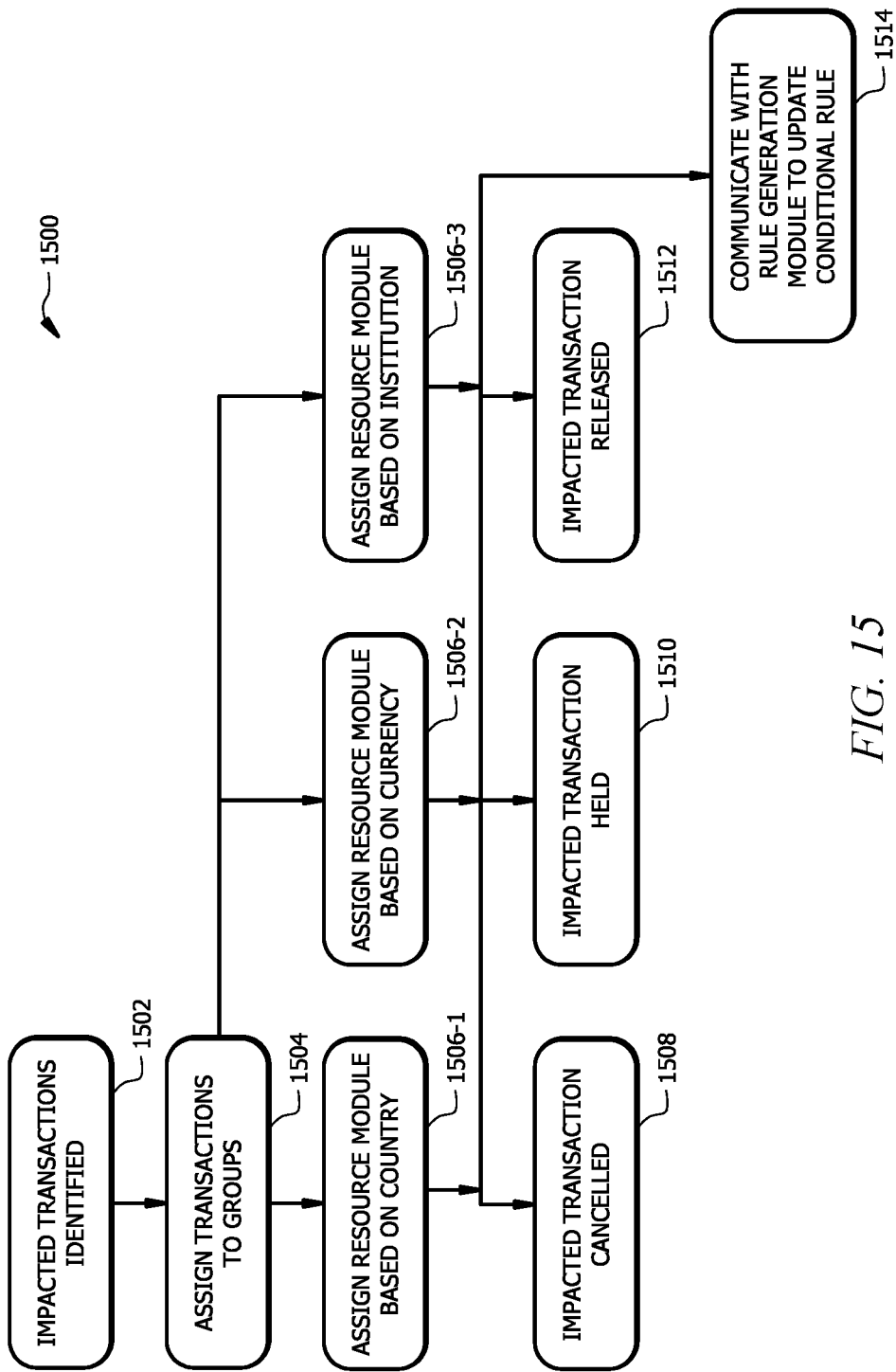
FIG. 15 is a flowchart of a process for resolving impacted transactions associated with a CBE.

Referring to the flowchart of FIG. 15 and the system diagram of FIG. 2, a process for resolving impacted transactions 224 starts at step 1502 when impacted transactions 224 are identified and stored in CBE data file 208.

At step 1504, impacted transactions 224 are assigned to groups 232. In some embodiments, resource allocation module 226 assigns impacted transactions 224 to groups 232. FIG. 2 depicts impacted transactions 224-1, 224-2 assigned to group 232-1 and impacted transactions 224-3, 224-4 assigned to group 232-2. In some embodiments, resource allocation module 228 assigns impacted transactions 224 to group 232 based on transaction information. For example, impacted transaction 224-1 (depicted in FIG. 11) is associated with the U.S. dollar as the currency and impacted transaction 224-2 is associated with the Euro as the currency. Other transaction information used as a basis to assign impacted transactions 224 to a group 232 includes, but is not limited to, the transaction information depicted in FIG. 10 and FIG. 14. In some embodiments, message notification module 212 tracks all impacted transactions 224 assigned to each group 232.

At step 1506, each group 232 is assigned to a resource module 228. As depicted in FIG. 2, impacted transactions 224-1, 224-2 assigned to group 232-1 and group 232-1 is assigned to resource module 228-1 and impacted transactions 224-3, 224-4 assigned to group 232-2 and group 232-2 is assigned to resource module 228-3. In each variation of step 1506, resource allocation module determines a common characteristic for a plurality of impacted transaction 224. In some embodiments, resource allocation module 226 assigns groups 232 to resource modules 228 based on account information 1402, transaction information 1404 or entity information 1406 associated with impacted transaction information 1400. For example, at step 1506-1, a group 232 of impacted transactions 224 may be assigned to a resource module based on a country, at step 1506-2, a group 232 of impacted transactions 224 may be assigned to a resource module based on a currency and at step 1506-3, a group 232 of impacted transactions 224 may be assigned to a resource module based on an institution. As an example, at step 1506-2, a group 232 may include impacted transactions 224 associated with the U.S. dollar as the currency and the first group 232 may be assigned to a first resource module 228 and a second group 232-2 may include impacted transactions 224 associated with the Euro as the currency and the second group 232 may be assigned to a second resource module. Other transaction information including, but not limited to, the transaction information depicted in FIG. 10 or FIG. 14 may be used by resource allocation module 226 as a basis to assign groups 232 to resource modules 228.

Each resource module 228 is implemented on the one or more processors and configured to analyze impacted transactions 224 assigned to a group 232. Resource modules 228 are configured to verify account information 1402, transaction information 1404 and entity information 1406, such as checking the spelling of a entity name 1406-1, verifying entity address 1406-2, verifying contact information 1406-3 and verifying other entity information including entity profile/preference information 1406. Resource modules 228 may analyze this information to identify suspect anomalies or trends. For example, a resource module 228 may identify a single transaction was attempted outside of normal operating hours or during a time when a contact would be unable to verify the transaction. Other resource modules 228 may be configured to monitor social networking sites or newsfeeds to determine if a group 232 of impacted transactions 224 is related to a post by a bad actor targeting an institution with malware. Other resource modules 228 may be assigned to identify trends, determine if a transaction represents a regularly scheduled transaction, or otherwise analyze transactions 224 using historical records, trends, or other information. For example, one or more resource modules 228 may be configured to verify a name, address or other account information listed on impacted transactions 224 is correct and determine if each impacted transaction 224 or impacted account ID 218 associated with a group 232 of impacted transactions corresponds to an entity associated with a data breach or some other cyber event. Thus, if there is a cyber event, one or more resource modules 228 may determine all impacted transactions 224 are associated with the data breach. One or more resource modules 228 may be configured to cancel impacted transactions. One or more resource modules 228 may be configured to send impacted transactions to a second resource module 228 to perform additional processing to determine if impacted transactions 224 should be released. If entity information provided with a transaction does not match the entity contact information 1406-3, resource module 228 may cancel the transaction or send the transaction to another resource module 228. Resource module 228 may contact an external resource to determine if an entity associated with affected account ID 218 was subjected to sanctions or other action. If the external resource confirms the entity was listed on a sanctions disapproved list, resource module 228 may cancel impacted transactions 224. Impacted transactions 224 may be assigned to one or more resource modules 228. Entity profile information 1406-3 may include commercial entity information such as an industry, size or other commercial characteristics. If a group 232 of impacted transactions 224 involve commercial entities in the same industry, resource allocation module 226 may assign all impacted transactions 224 to resource module 228 based on the industry. Resource modules 228 may perform other analyses.

At step 1508, one or more impacted transactions 224 in a group 232 may be cancelled such that some or none of the transactions in group 232 are processed. In some embodiments, resource module 228 associated with group 232 sends a cancelled transaction notification to message notification module 212.

At step 1510, one or more impacted transactions 224 in a group 232 are held for further processing, until an entity can be contacted during normal operating hours, or otherwise not cancelled but not released.

At step 1512, one or more impacted transactions 224 in a group 232 are released for processing by transaction processing module 20. In some embodiments, resource module 228 associated with group 232 sends a released transaction notification to message notification module 212.

Embodiments allow a circuit breaker to be modified as new information is learned and allow groups of transactions to be released to minimize the effects of a cyber event on financial institutions. Minimizing the effects of a cyber event may include minimizing the number of accounts impacted based on transaction rails, payment methods impacted, transaction direction, currency, geographic area, or other criteria. In some embodiments, if all impacted transactions 224 in a group 232 are allowed, one of resource module 228 associated with the group 232 or message notification module 212 sends a notification to rule generation module 218. Rule generation module 218 is configured to add, delete or modify conditional rules 222 to update one or more of match criteria 806, condition 808, match value 810 and action 812 such that subsequent financial transactions received by transaction processing module 20 compares transactions against the updated conditional rule 222. Process 1500 ends at step 1514 when embodiments send updated one or more of match criteria 806, condition 808, match value 810 and action 812 to rule generation module 218. In some embodiments, resource module 434 communicates decision information with account identification module 216 to add, delete or modify account IDs 218.

Embodiments disclosed herein enable users to visualize management of a cyber event on accounts and clients. FIG. 16 depicts simplified display 1600 as an updated version of display 1300, for displaying updated CBE information 1602 identifying one or more circuit breaker events 1604 with CBE ID 210, CBE start date column 510 transaction count column 1608 indicating a number of impacted transactions 224 and a CBE status column 1610. Table 1612 may include impacted payment column 1614, payment value column 1616, impacted account column 1618 and impacted client column 1620. As depicted in FIG. 16, first row 1624-1 may present a updated total impacted transaction information 1622-1 for a total number of impacted transactions 224 associated with CBE ID 210, updated total impacted transaction value 1622-2 for a total number of impacted transactions 224 associated with CBE ID 210, updated total impacted account information 1622-3 for a total number of impacted transactions 224 associated with CBE ID 210 and updated total number of clients 1622-4 for a total number of impacted transactions 224 associated with CBE ID 210. Similarly, rows 1624-2, 1624-3 and 1624-4 may present updated impacted transaction information 1622-1 for impacted transactions 224 that are held, released or cancelled, an updated value 1622-2 for impacted transactions 224 that are held, released or cancelled, updated account information 1622-3 for impacted transactions 224 associated with CBE ID 210 that are held, released and cancelled and updated client information 1622-4 for transactions 224 associated with CBE ID 210 that are held, released and cancelled.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A transaction processing system communicatively coupled to a plurality of external institutions, the transaction processing system comprising:
a memory that stores executable instructions and a plurality of accounts associated with the plurality of external institutions, wherein each external institution is associated with at least one account; and
one or more hardware processors coupled to the memory, wherein the executable instructions are executed by the one or more hardware processors to cause the one or more hardware processors to:
receive transactions from the plurality of external institutions;
store a copy of the received transactions in a transaction memory;
receive a notification of a cyber event;
create a circuit breaker event (CBE) data file;
identify, from the notification, the cyber event and an entity comprising one or more of a country, an institution, and a payment system associated with the cyber event;
assign a CBE identifier (ID) corresponding to the CBE and store the CBE ID in the CBE data file, the CBE ID including the cyber event and the entity;
identify, in an account memory, a set of accounts associated with the entity and the cyber event;
store an account identifier (ID) for each affected account of the one or more affected accounts in the CBE data file;
generate a conditional rule corresponding to the CBE ID, the conditional rule comprising a set of rules including a transaction screening criteria, a condition and an action if the condition is satisfied;
store a record of the conditional rule in the CBE data file;
determine, based on the conditional rule, whether to process a transaction according to the set of rules;
if the transaction does not satisfy the condition of the conditional rule:
process the transaction according to the set of rules;
store a record of the processed transaction in a processed transaction memory;
store information for the processed transaction in the CBE data file;
if the transaction satisfies the condition of the conditional rule:
store the transaction in the CBE data file as an impacted transaction;
store information for the impacted transaction in the CBE data file;
retrieve, from the CBE data file, the CBE ID and information for each impacted transaction;
determine, for each affected account ID, a quantity of impacted transactions;
display the CBE ID, the conditional rule and the quantity of impacted transactions associated with the conditional rule;
determine if each impacted transaction should be a released transaction or a cancelled transaction;
send information relating to each cancelled transaction to the CBE data file; and
process each released transaction based on transaction information of the released transaction.

2. The transaction processing system of claim 1, wherein the one or more hardware processors further assign one or more impacted transactions based on at least one of a currency, a global client identifier (GCI) associated with the affected account ID, and a transaction amount.

3. The transaction processing system of claim 2, wherein the one or more hardware processors further:
calculate a total number of impacted transactions, a total number of released transactions and a total number of cancelled transactions; and
send for display, the CBE ID, the conditional rule, and one or more of the total number of impacted transactions, the total number of released transactions and the total number of cancelled transactions.

4. The transaction processing system of claim 3, wherein the one or more hardware processors further:
identify two or more accounts associated with the entity; and
generate a first conditional rule corresponding to a first account ID associated with the entity and generate a second conditional rule corresponding to a second account ID associated with the entity.

5. The transaction processing system of claim 3, wherein the one or more hardware processors further:
in response to a cancelled transaction,
determine an account ID associated with the cancelled transaction;
populate a return to sender (RTS) message with the account ID associated with the cancelled transaction; and
send the message to an entity associated with the account ID associated with the cancelled transaction.

6. The transaction processing system of claim 5, wherein:
the first account ID is associated with a first payment system;
and
the one or more hardware processors further send a message to an external institution associated with the first account, the message including one or more of the first account ID and the impacted transaction.

7. The transaction processing system of claim 2, wherein the conditional rule comprises transaction screening criteria comprising: any account ID associated with the entity, any credit side account ID associated with the entity, any debit side account ID associated with the entity, any account ID associated with the entity for a country, any credit side account ID associated with the entity for the country, any debit side account ID associated with the entity for the country, any account ID associated with the entity associated with a payment system, any credit side account ID associated with the entity for the payment system, and any debit side account ID associated with the entity for the payment system.

8. A transaction processing system communicatively coupled to a plurality of external institutions, the transaction processing system comprising:
a memory that stores executable instructions and a plurality of accounts associated with the plurality of external institutions, wherein each external institution is associated with at least one account; and one or more hardware processors coupled to the memory, wherein the executable instructions are executed by the one or more hardware processors to cause the one or more hardware processors to:
receive files from the plurality of external institutions; for each file:
uncompress the received file into a plurality of transactions in a data file;
load a copy of the plurality of transactions in a data structure in a transaction memory;
receive a notification of a cyber event;
create a circuit breaker event (CBE) data file;
identify, from the notification, the cyber event and an entity comprising one or more of a country, an institution, and a payment system associated with the cyber event;
assign a CBE identifier (ID) corresponding to the CBE and store the CBE ID in the CBE data file, the CBE ID including the cyber event and the entity;
identify, in the memory, a set of accounts associated with the entity and the cyber event;
store an account ID for each affected account of the one or more affected accounts in the CBE data file;
generate a conditional rule corresponding to the CBE ID, the conditional rule comprising a set of rules including a condition associated with the account ID and an action if the condition is satisfied;
store the record of the conditional rule in the CBE data file;
determine, based on the conditional rule, whether to process a transaction according to the set of rules, wherein
if the transaction does not satisfy the condition of the conditional rule:
process the transaction according to the set of rules;
store a record of the processed transaction in a processed transaction memory; and
store information for the processed transaction in the CBE data file;
if the transaction satisfies the condition of the conditional rule:
store the transaction in the CBE data file as an impacted transaction; and
store information for the impacted transaction in the CBE data file;
calculate a total number of impacted transactions for each account ID, a total transaction amount for each account ID, a total number of account IDs having at least one impacted transaction, a total number of impacted transactions for the total number of account IDs, and a total transaction amount for the total number of account IDs;
display the CBE ID, the conditional rule, and one or more of the total number of impacted transactions for each account ID, the total transaction amount for each account ID, the total number of account IDs having at least one impacted transaction, the total number of impacted transactions for the total number of account IDs, and the total transaction amount for the total number of account IDs;
determine if each impacted transaction should be a released transaction or a cancelled transaction;

send information relating to each cancelled transaction to the CBE data file; and
process each released transaction based on transaction information of the released transaction.

9. The transaction processing system of claim 8, wherein the one or more hardware processors further:
assign each impacted transaction to a group of a plurality of groups;
determine a quantity of impacted transactions in the group, wherein all transactions are assigned to the group based on a country, an account ID, a currency, a transaction direction or a transaction amount; and
assign the group based on the country, the account ID, the currency, the transaction direction or the transaction amount.

10. The transaction processing system of claim 9, wherein the one or more hardware processors further:
determine if each impacted transaction assigned to the group should be a released transaction or a cancelled transaction;
for each cancelled transaction;
determine the quantity of impacted transactions in the group;
for each released transaction:
determine the quantity of impacted transactions in the group, wherein
if all impacted transactions assigned to the group are released,
generate an updated conditional rule based on the country, the account ID, the currency, the transaction direction or the transaction amount.

11. The transaction processing system of claim 9, wherein:
the notification of the cyber event is associated with a transaction payment system;
the one or more hardware processors further:
determine the condition applies to an account ID associated with the transaction payment system for each external institution;
identify all account IDs associated with the transaction payment system for the plurality of external institutions;
generate a conditional rule corresponding to the CBE ID, the conditional rule comprising a condition that any account ID associated with the transaction payment system is stored in a queue in the CBE data file;
calculate a total number of impacted transactions for each account ID associated with the transaction payment system;
calculate a total transaction amount for each account ID associated with the transaction payment system; a total number of account IDs having at least one impacted transaction associated with the transaction payment system;
calculate a total number of impacted transactions for the total number of account IDs associated with the transaction payment system; and
calculate a total transaction amount for the total number of account IDs associated with the transaction payment system.

12. The transaction processing system of claim 9, wherein the one or more hardware processors further cancel an impacted transaction based on one or more of the account ID corresponds to an entity listed in a sanctions disapproved list, external institution information in the transaction information does not match external institution information associated with the account ID, the account ID corresponds to an entity associated with a data leak, and an account ID corresponds to an entity associated with an industry.

13. The transaction processing system of claim 9, wherein the one or more hardware processors further communicate with an external institution associated with the data leak to determine if the account ID associated the impacted transaction corresponds with information corresponding to the data leak.

14. A computer program product comprising executable instructions stored in a non-transitory computer readable medium that when executed by a processor causes the processor to:
    cause a memory to store a plurality of accounts associated with the plurality of external institutions, wherein each external institution is associated with at least one account;
    receive files from the plurality of external institutions, each file including a plurality of transactions;
    receive a notification of a cyber event:
    create a circuit breaker event (CBE) data file;
    identify, from the notification, an event type and an entity comprising one or more of a country, an institution, and a payment system associated with the event type;
    assign a CBE identifier (ID) corresponding to the CBE and store the CBE ID in the CBE data file, the CBE ID including the event type and the entity; and
    receive a circuit breaker notification including the CBE ID;
    identify a set of accounts associated with the entity and the event type;
    store the account ID for each affected account of the one or more affected accounts in the CBE data file;
    generate a conditional rule corresponding to the CBE ID, the conditional rule comprising a set of rules including a condition associated with the account ID and an action if the condition is satisfied;
    store the record of the conditional rule in the CBE data file;
    determine, based on the conditional rule, whether to process a transaction according to the set of rules, wherein:
        if the transaction does not satisfy the condition of the conditional rule:
            process the transaction according to the set of rules;
            store a record of the processed transaction in a processed transaction memory; and
            store information for the processed transaction in the CBE data file;
        if the transaction satisfies the condition of the conditional rule:
            store the transaction in the CBE data file as an impacted transaction;
            store information for the impacted transaction in the CBE data file; and
    calculate a total number of impacted transactions for each account ID, a total transaction amount for each account ID, a total number of account IDs having at least one impacted transaction, a total number of impacted transactions for the total number of account IDs, and a total transaction amount for the total number of account IDs;
    display the CBE ID, the conditional rule, and one or more of the total number of impacted transactions for each account ID, the total transaction amount for each account ID, the total number of account IDs having at least one impacted transaction, the total number of impacted transactions for the total number of account IDs, and the total transaction amount for the total number of account IDs;
    determine if each impacted transaction should be a released transaction or a cancelled transaction;
    send information relating to each cancelled transaction to the CBE data file; and
    process each released transaction based on transaction information of the released transaction.

* * * * *